TYPE COMPOSING APPARATUS

Filed Oct. 1, 1957 2 Sheets-Sheet 1

INVENTOR.
ELLIS P. HANSON
RENE A. HIGONNET
ABRAHAM MANEVITZ
LOUIS M. MOYROUD
BY
KENWAY, JENNEY, WITTER & HILDRETH
ATTORNEYS

Oct. 27, 1959 E. P. HANSON ET AL 2,910,163

TYPE COMPOSING APPARATUS

Filed Oct. 1, 1957 2 Sheets-Sheet 2

INVENTOR.
ELLIS P. HANSON
RENE A. HIGONNET
ABRAHAM MANEVITZ
LOUIS M. MOYROUD

BY KENWAY, JENNEY, WITTER & HILDRETH
ATTORNEYS

United States Patent Office 2,910,163
Patented Oct. 27, 1959

2,910,163

TYPE COMPOSING APPARATUS

Ellis P. Hanson, Rowley, Rene A. Higonnet, Cambridge, Louis M. Moyroud, West Medford, and Abraham Manevitz, Waltham, Mass., assignors to Graphic Arts Research Foundation, Inc., Cambridge, Mass., a corporation of Delaware Application October 1, 1957, Serial No. 687,571

9 Claims. (Cl. 197—19)

The present invention relates generally to type composition involving tabulation. More particularly, it relates to improvements in the apparatus described in the copending application of Higonnet and Moyroud Serial No. 531,023, filed August 29, 1955, and concerns apparatus for transmitting composing information to a memory device or devices, such information including the identities and different widths of the composed characters and other information to indicate the spaces necessary for tabulation.

The objects of this invention include the provision of means to compute, determine and transmit to a suitable memory device or devices the space widths and other information necessary to accomplish various forms of tabulation. In referring to these forms it is useful to define the full page width occupied by the text as the "justified line length." In tabulated text this length is divided between a number of "column widths" which may be equal or unequal. In general, the width of the actual text to occupy any particular column in a line is less than the corresponding column width. We define the desired forms of tabulation as "tab left" wherein the text is made flush with the left margin of its corresponding column, "tab right" wherein it is made flush with the right margin of its column, "tab center" wherein it is centered between the left and right margins of its column, and "tab leaders" wherein a part of the text is flush with the left margin of its column and the rest of the text is flush with the right margin, the intervening space between the two portions of text being filled with a blank space or "leaders" which are characters of any suitable shape, commonly asterisks or dots.

The above-mentioned application describes apparatus capable of composing tabulated text in any of the above forms by means of the operation therein termed "multiple justification." While this operation is satisfactory for occasional tabulation, it presents certain difficulties in composing larger quantities of tabulated text. These arise from the fact that the storage and transcription cycles in a given line proceed a column at a time rather than a line at a time, and justification computations are carried out after each column is stored and before it is transcribed. Thus for each column in a given line the "justified line length" is set to the width of the particular column. This is time-consuming, and moreover, the text typed on the unjustified copy viewed by the machine operator displays on separate lines the items composed on the film in adjacent columns of the same line, thus making it difficult to check each line before "sending," i.e. transcribing it.

It is therefore another object of the invention to improve the apparatus of the above application by making it faster and more convenient for the composition of tabulated text. In particular, it is desired to accomplish tabulation without changing the normal justified line length setting.

Figure 1:
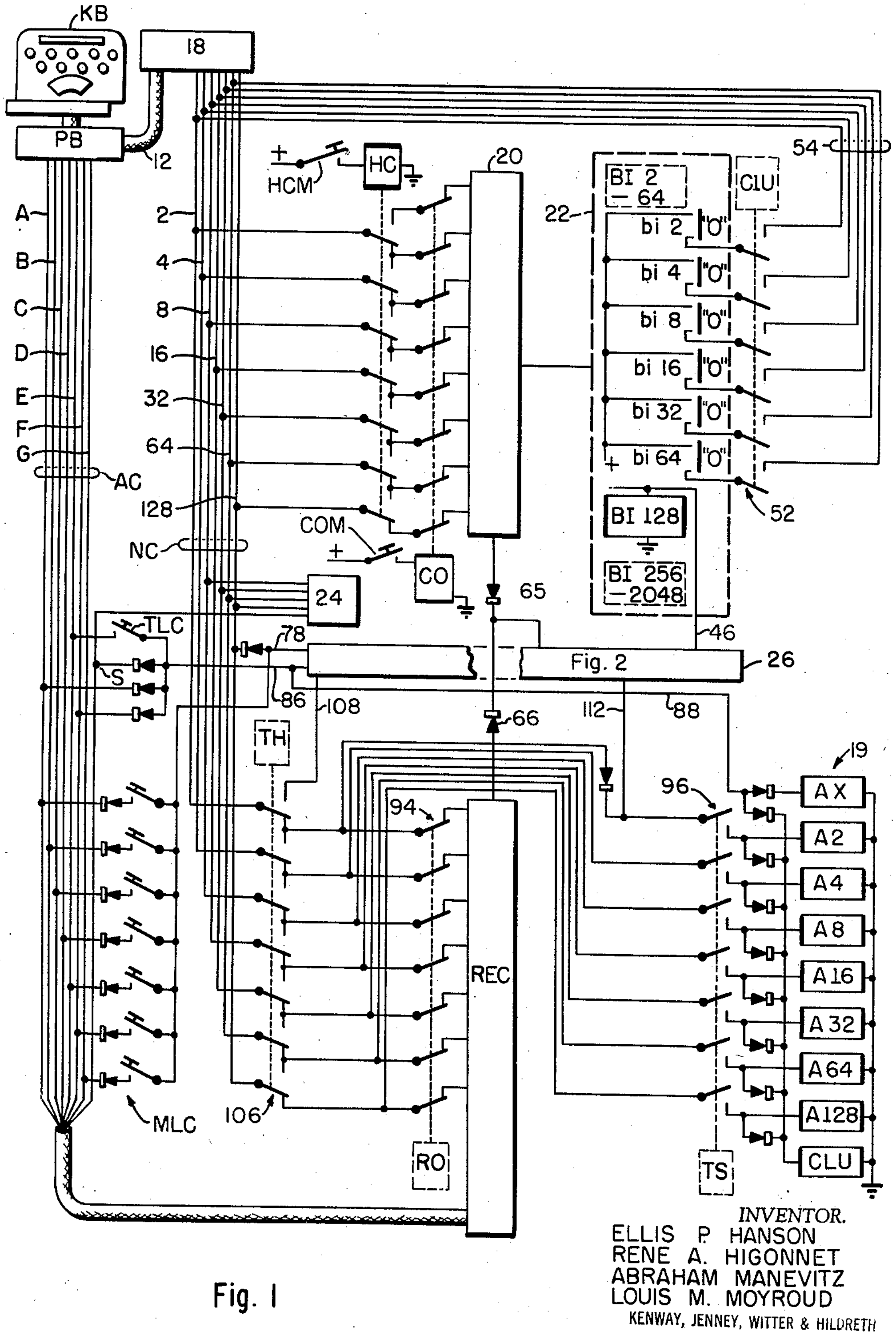
Figure 2:
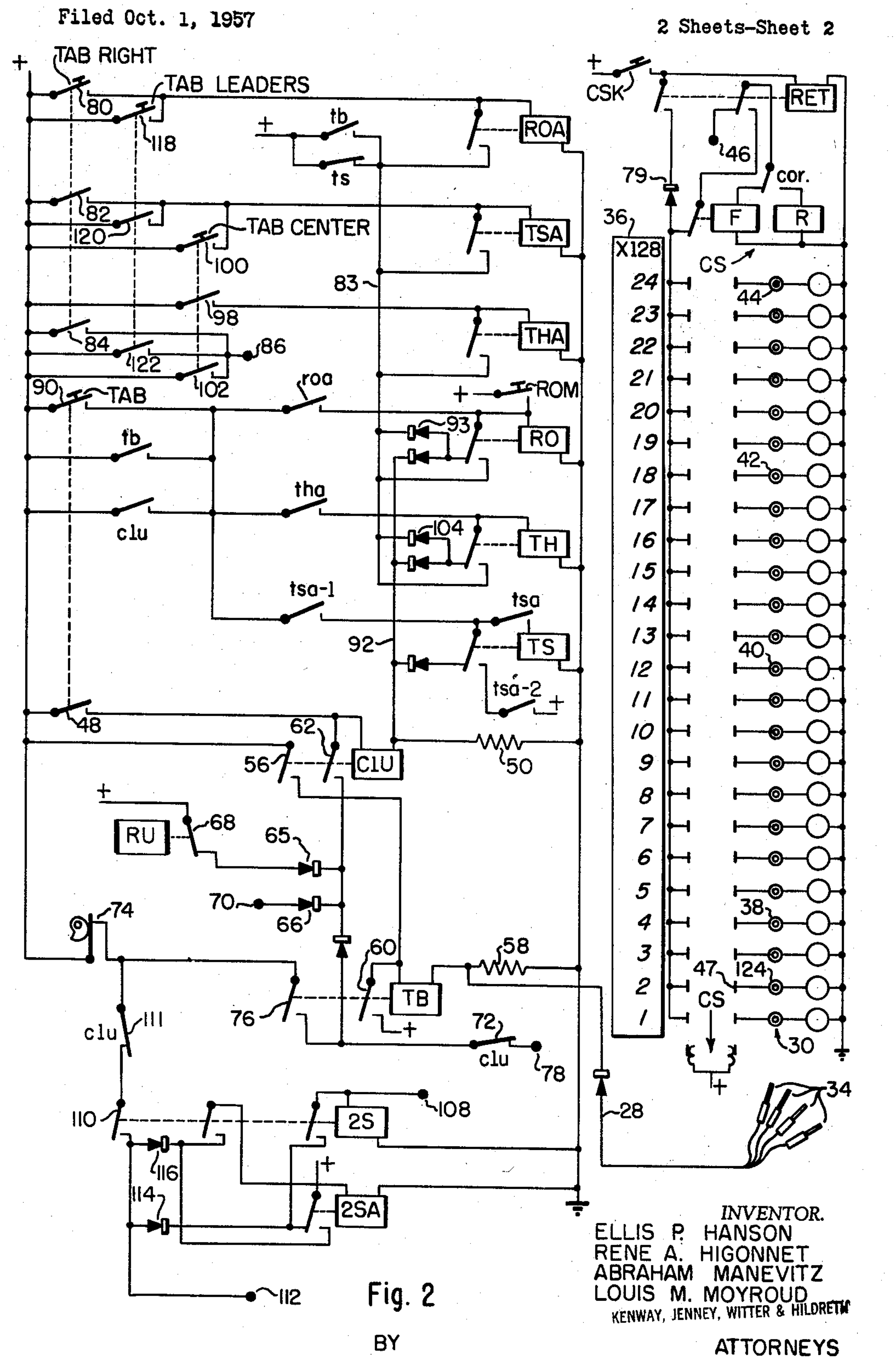

With the foregoing and other objects in view, the features of the invention reside in the improvements in circuitry herein described for use in the circuits of said application which is incorporated herein by reference, having reference to the appended drawings illustrating a preferred form of the invention, in which Fig. 1 is a schematic circuit diagram, partially fragmentary, illustrating portions of the circuit according to the invention and showing the relationship thereof to the circuit of the above-mentioned application; and Fig. 2 is a schematic circuit diagram showing details of the tabulation control circuit 26 in Fig. 1.

Fig. 1 illustrates a portion of the photographic type composing machine described in the above-mentioned application. Since the tabulation operations herein described are concerned only with the recording or "storage" part of the machine operation, the parts associated with photographic transcription and spacing of the characters stored in the register and with the computation of justifying space increments are not shown.

A keyboard KB is provided and is preferably associated with a non-justifying typewriter upon which the text is displayed as it is composed. This provides the operator with an opportunity to check the composition of each line before it is transcribed. The keyboard is associated with a permutation bar unit PB by which a positive voltage (with respect to ground) is selectively connected to combinations of output leads. The output leads include a code cable AC of seven wires A, B, C, D, E, F and G which are energized in combinations to designate the characters and certain coded information needed for transcription, all as described in said application. An output cable 12 is identical with the cable 12 in said application and has a separate wire energized by operation of each key of the keyboard. The cable 12 is connected with a unit 18 which is identical with the unit 18 in said application. As there described, this unit preferably takes the form of apparatus including multiple-circuit connecting elements or cards as described in detail in the copending application of Higonnet and Moyroud Serial No. 500,397, filed April 11, 1955, now abandoned. The purpose of the unit 18 is to connect a positive voltage to combinations of wires 2, 4, 8, 16, 32, 64 and 128 forming a code cable NC according to the wire energized in the cable 12, to represent the width of each typed character, taking into account its width in relation to other characters in the same alphabet, the style and point size of the alphabet and the set width selected for composition. The width is represented in binary form by assigning the value "1" to energized wires and giving to such wires the values designated by their respective reference numbers.

As described in said application Serial No. 531,023, the code cable AC is connected from the permutation bars PB to a recording unit REC. The unit REC may be of any desired form but is preferably a set of movable hammers cooperating with a pin register REG such as is described in U.S. Patents 2,690,249 and 2,790,362. Information is stored in this form of register by selective movement of combinations of pins each having two alternative positions, there being in this embodiment a column of fifteen pins to represent each separate unit of information in a single line, such as a character or transcription instruction code. The unit REC includes a hammer for each pin in a single column and is mechanically connected with the platen carriage of the non-justifying typewriter.

The input circuit within the unit REC (not shown) is preferably of the type fully described in the application of Grea, Hanson, Higonnet and Moyroud Serial No. 402,785, filed January 7, 1954, and illustrated in Fig. 2 thereof. In Fig. 2 of said application, a lead 36 sustains the voltages for energizing the hammer circuits until all hammers are properly operated, and leads A to D therein illustrate the connections to the unit REC for the code cable AC of the present application. Similarly, leads 1 to 8 in Fig. 2 of said application illustrate the connections for the hammers associated with the code cable NC. However, according to this invention the connections from the unit 18 to the unit REC include contacts of relays TH and RO associated with tabulation as shown in Fig. 1 hereof. These relays are described in detail below. The connections also communicate with an auxiliary register 19 which is used to store certain information involved in certain operations of tabulation. The register 19 may take any suitable form, but is preferably a paper tape punched by a perforator having provision for eight hole punches arranged transversely of the tape. The mechanical parts of the perforator are conventional and are not illustrated. Each punch has a solenoid designated by the letter "A" followed by "X," or 2–128 in binary steps. A clutch solenoid CLU is also provided. When energized, this solenoid steps the paper longitudinally after a short delay, and it will be noted that this occurs after any signal is received on any one of the leads to solenoids AX–A128.

As described in said application Serial No. 531,023, the code cable NC is also directly connected with sets of relays E2 to E128 and WCR2 to WCR128, all as shown in Figs. 1 and 3 thereof. There connections are for the purpose of adding the widths of the characters in an accumulator for justification purposes. For purposes of the present invention these direct connections are replaced by the indirect connections illustrated in Fig. 1 hereof, in which an accumulator input circuit 20 is identical with the circuit of Fig. 3 of said application. Similarly an accumulator 22 operated by the circuit 20 is identical with that shown in Fig. 4 of said application with certain additional connections hereinafter described. As schematically illustrated herein, the accumulator consists of binary switches BI2 to BI2048. Each switch has two stable positions. The binary stages of higher order shown in said application Serial No. 531,023 are of no importance with reference to this invention.

There is further provided a fixed space unit 24 which is shown in detail in Fig. 2 of said application Serial No. 531,023. The purpose of this unit is to send a space code designating any one of a number of selectable widths without a corresponding character.

A tabulation control circuit 26 shown in detail in Fig. 2 contains the circuits to control the connections described above as well as other circuits necessary for tabulation in accordance with this invention.

From the foregoing description it will be understood that in the storage cycle of a given line of type the wires 2 to 128 are energized in successive combinations to represent in binary form the widths of the successive selected characters and spaces. In a non-tabulated line, signals are produced to give rise to the various operations such as "justification," "flush right," "automatic centering," "leaders," "multiple justification," etc., all as described in detail in said application Serial No. 531,023. However, in addition to these operations, the machine also performs the tabulation operations which are described below with particular reference to the tabulation control circuit 26.

Within the circuit 26 there are provided a number of keys biased to the open position including those designated Tab Right, Tab Leaders, Tab Center and Tab which are in position adjacent the keyboard for selective operation. There are also provided a number of relays ROA, TSA, THA, RO, TH, TS, C1U, TB, 2S and 2SA, the contacts of which are shown in the positions reached when their coils are unenergized. The contacts are shown either as mechanically connected with the coils or with reference designations the same as their corresponding operating coils but in the lower case. A 25-position stepping switch CS having a forward-stepping coil F and a reverse stepping coil R is connected by a wire 28 with the relay circuit. The switch CS has brushes connected with a source of voltage. Its contacts are connected with 24 plug jacks 30 into which a number of tabulation selector plugs 34 may be inserted. Associated with the contacts is a scale 36 numbered from "1" to "24." The scale indicates units of width in multiples of 128 units, and the plugs 34 are inserted by the machine operator in the jacks 30 corresponding to the desired column widths. It will be noted that the jacks are connected in common to the wire 28.

Other parts of the tabulation apparatus are described below in connection with related operations. We now turn to a detailed description of these operations, in each of which the plugs 34 are assumed to be inserted in jacks 38, 40, 42 and 44 for purposes of illustration.

*Tab left*

In this form of tabulation, the text of each column is made flush with the left margin of the column. The keyboard sequence is as follows: (1) preset the accumulator, (2) type the text of column 1, (3) depress key Tab, (4) type the text of column 2, (5) depress key Tab, etc. The resulting operations affect the accumulator and register entries as follows.

Step (1) is to set the accumulator with an initial count such that the switches BI2 to BI512 are in their "1" positions and switches BI1024 and BI2048 in their "0" positions. This is accomplished as described in said application Serial No. 531,023.

In step (2) the register and accumulator entries are normal and occur as described in said application Serial No. 531,023. It will be understood that in the ordinary case the widths of the characters and interword spaces accumulated will not be as great as the width assigned to column 1 which in the given example is 4 times 128, or 512 units. In addition, the accumulator sends width total information to the switch CS in the tabulation circuit in the form of a stepping pulse on a lead 46 (Figs. 1 and 2) extending from the coil of accumulator switch BI128 identical with the correspondingly designated switch in Fig. 4 of said application Serial No. 531,023. The circuit extends through break contacts of a return relay RET, break contacts "cor" and the forward stepping coil F to ground. The connections of the lead 46 to a source of voltage are identical with the circuit shown and described in detail in the last-mentioned application. It has been found that no key entry calls for a width sufficiently great to require energization of the lead 128. The lead 46 will therefore be energized in any case on a carry-over signal from the next lower order stage, and such signal occurs once each time the accumulated width total reach a multiple of 128 units. Thus if we assume in the present example that 240 units are stored, and given the fact that switches BI2 to BI64 are preset to their "1" positions, there will have been two stepping pulses and the switch CS will have reached its position 47 when all the characters in the column have been selected.

We may here note that the contacts "cor" are associated with a correction relay COR described in said application Serial No. 531,023. When this relay is energized during storage of a line, the information in the register and accumulator relative to a given character is "erased." At the same time, the illustrated contacts reverse the stepping direction of the switch CS to keep it in agreement with the accumulator.

In step (3) the depression of the key tab results in the entry of widths in one or more register positions following that of the last-selected character. These widths in total equal the remaining space in the column, and when "read" by the transcribing unit they will cause it to space to the left margin of column 2. The first width entered is the amount required to bring the accumulated width of the column to the next higher multiple of 128 units. The succeeding widths equal 128 units each, and there are as many such widths as are necessary to bring the switch CS to the first plug at the jack 38. These width entries occur as follows:

Contacts 48 of the key tab close to energize the relay C1U through a resistor 50 (Fig. 2). Contacts 52 of this relay (Fig. 1) cause energization of wires in a cable 54 for each of switches BI2 to BI64 then in the "zero" position. Since these stages were preset to the binary value 111111, the subsequent addition of 240 units brings the value represented by these stages to 110111. Therefore only the lead 16 will be energized through its connection to the cable 54. The result is that the value "16" is added to the accumulator and entered in the register. The significance of the value entered in this fashion, in any case, is seen to be that such value is the amount necessary to bring the total entered after the stages were preset to 1's in step (1) to a multiple of 128, which occurs when all such stages are again 1's. It will be observed that in no case will this step the switch CS. It remains in position 47 which is designated 2×128, or 256 which, it will be noted, is the sum of the 240 units entered in step (2) and the 16 units entered in step (3).

At the same time, contacts 56 of the relay C1U energize the relay TB through a resistor 58. The relay TB holds on its contacts 60. Also at the same time, the relay C1U holds temporarily on its contacts 62 through either of two rectifiers 65 or 66. The rectifier 65 is connected through break contacts 68 of a relay RU. This is the same as the relay of like designation in Fig. 3 of said application Serial No. 531,023 and the break contacts 68 are additional to the contacts shown therein. As there described, the contacts remain closed until the step (3) entry in the accumulator is completed. The rectifier 66 is connected at 70 to a lead shown in said application Serial No. 402,785, Fig. 2, and there designated at 36. Said lead 36 similarly remains energized until the step (3) entry in the register is completed. Thus the rectifiers 65 and 66 function to assure completion of entries in the accumulator and register.

Release of the key tab deenergizes the relay C1U and closes its contacts 72 as soon as the holding circuit through its contacts 62 is deenergized. This completes a circuit from cam contacts 74 which are continuously and intermittently closed at a fast rate, through make contacts 76 of the relay tab to a connection 78 joined to the lead 128 as shown in Fig. 1. As a result, pulses reach the lead 128 and cause successive entries of the value "128" in the accumulator. Each entry reaches the coil of the switch BI128 and the lead 46 and steps the switch CS. Finally, a pulse (the second one in this example) brings the brushes of the switch CS to the position of the first selected jack 38. The brushes then connect a positive voltage through the jack 38 and the lead 28 to short-circuit the relay TB with this voltage and cause it to be deenergized. Then, when the contacts 76 of this relay open, the pulse circuit is interrupted. This completes the register and accumulator entries for column 1. It will be noted that the total width in the accumulator and register equals the assigned total width of the column. The steps for each succeeding column are repetitions of those described above. It will be understood that justification will not be used in transcribing a line composed as described above, or by any of the methods described below. As described in said application Serial No. 531,023, depression of the space bar associated with the keyboard enters a fixed space in the register. It will be clear that the size of this space is a matter of choice in design of the machine.

At the end of the composition of each line the switch CS is returned to its illustrated position by closing a key CSK. This energizes the relay RET which holds through a rectifier 79 on the homing level and the voltage on the brushes energizes the coil F through its own break contacts and make contacts of the relay RET. The switch steps until the homing circuit is broken. This same return operation is also accomplished after each of the other tabulation procedures described below.

*Tab right*

In this form of tabulation, the text of each column is made flush with the right margin of the column. The keyboard sequence is as follows: (1) preset the accumulator, (2) depress key Tab Right, (3) type the text of column 1, (4) depress key Tab, (5) repeat above steps starting with step (2), etc. The resulting operations affect the accumulator and register entries as follows.

Step (1) is identical with that described for the "tab left" operation. The switches BI2 to BI512 are preset to "1's" and the switches BI1024 and BI2048 to "0's."

In step (2) the depression of the key Tab Right causes energization of relays ROA and TSA through contacts 80 and 82, respectively. These relays hold on a lead 83 which is connected to a positive voltage through break contacts *ts*. Through contacts 84 a terminal 86 is energized (see also Fig. 1). This sends a code "SAF" to the register through the cable AC. When this code is read during transcription it causes width information stored in the auxiliary register 19 to be sent to the character spacing mechanism. The space which the mechanism moves will have been computed as described below and is equal to the space to be inserted before the text of the first column to make it flush with its selected right margin. The connection 86 is also extended by a lead 88 to the coil of the X-solenoid in the auxiliary register and to the clutch coil CLU, causing the paper tape to advance one step.

In step (3) the register and accumulator entries are normal and occur as described in said application Serial No. 531,023. This step is identical with step (2) in the "tab left" sequence described above. At its conclusion, taking the given example, a total of 240 space units will have been entered in the register and added in the accumulator.

In step (4) depression of the key Tab closes its contacts 48, initiates the operations depending thereon, and also closes circuits through its contacts 90. The relay RO is energized through make contacts *roa* and the relay TS is energized through make contacts *tsa*–1 and holds by its own make contacts connected through make contacts *tsa*–2 to a positive voltage. The coils of these latter relays are connected by their respective break contacts and rectifiers to a lead 92 which holds a short-circuit on the relay C1U until the relays RO and TS have operated. Also, a rectifier 93 holds a positive voltage on the lead 83 to ensure that the relays ROA and TSA will remain held until the relay RO has become energized. It will be noted that contacts 94 (Fig. 1) of the relay RO disconnect the cable NC from the register and that contacts 96 of the relay TS connect this same cable to the auxiliary register 19.

Once the relay C1U becomes energized, the relays ROA, TSA and RO hold through make contacts *tb*, now closed, and the circuit operation is the same as that described above under step (3) in the "tab left" operation, except that the space entries "16," "128" and "128" go to the auxiliary register 19 and not to the unit REC. The tape is stepped after each entry, whereby the information in the tape for this operation is represented by an "X"-punch followed by three rows of space identifying punches. As previously described, the computation ends by energization of the lead 28 which short-circuits the relay TB. This opens the holding circuit through the break contacts *tb* for the relays ROA, TSA and RO, and the opening of make contacts *tsa*–2 deenergizes the relay TS. Thus the register and accumulator entries for column 1 are completed. It will be noted that the width in the accumulator equals the assigned total width of the column, but the total of the character widths in the register entries to the unit REC equals only the length of the text. The difference between the selected column length and this length is stored in the tape and is "read out" to the character spacing mechanism during transcription when the code "SAF," appearing before the text in the register, is sensed. The steps for each succeeding "flush right" column are repetitions of those described above.

*Tab center*

In this form of tabulation, the text of each column is centered between the margins thereof. The keyboard sequence is as follows: (1) preset the accumulator, (2) depress the key Tab Center, (3) type the text of column 1, (4) depress key TAB, (5) repeat above steps starting with step (2), etc. The resulting operations affect the accumulator and register entries as follows.

Step (1) is identical with step (1) in each of the above-described operations.

In step (2) the depression of the key Tab Center causes energization of relays THA and TSA through contacts 98 and 100, respectively. These relays lock on the lead 83 through break contacts *ts*. Through contacts 102 the terminal 86 is energized to send the code "SAF" to the register REC through the cable AC. As in the "flush right" operation, when this code is read during transcription it will cause width information stored in the auxiliary register to be sent to the character spacing mechanism. The space which the mechanism moves will have been computed as described below. Through the lead 88 an "X"-punch is also sent to the tape register and it then advances one step.

In step (3) the register and accumulator entries are normal and occur as described in said application Serial No. 531,023. This step is identical with step (2) in the "tab left" sequence described above. At its conclusion, taking the given example, a total of 240 space units will have been added in the register and accumulator.

In step (4) depression of the key Tab closes its contacts 48, initiates the operations depending thereon, and also closes circuits through its contacts 90. The relay TH is energized through make contacts *tha* and the relay TS is energized through make contacts *tsa*–1 and holds on its own make contacts and make contacts *tsa*–2. The coils of these latter relays are connected by their respective break contacts and rectifiers to the lead 92 to hold a short-circuit on the relay C1U until the relays TH and TS have operated. Also, a rectifier 104 holds a positive voltage on the lead 83 to ensure that the relays THA and TSA will remain held until the relay TH has become energized. It will be noted that contacts 96 of the relay TS connect the cable NC to the auxiliary register 19, and that other contacts 106 of the relay TH transfer the connections to both registers from the cable NC one step downwardly in the binary order, except for the lead 2. It will be understood that, except for this lead, the transfer will reduce the binary entries to one-half the value appearing on the cable NC. The lead 2 is transferred to a lead 108 leading to the tabulation control circuit. The effect of this connection, as described below, is that in case the lead 2 becomes energized, its value is not divided with half sent to the unit REC and half to the auxiliary register 19. Instead, the value "2" is entered in the latter register only, whereby the total of any width values appearing on the cable NC is in any case exactly equal to the sum of the values stored in the two registers, although these latter values may differ by 2 units.

Once the relay C1U becomes energized as described above, the relays THA, TSA and TH hold through make contacts *tb*, now closed, and the circuit operation is similar to that described above under step (3) in the "tab left" operation with the exceptions noted below. Closure of contacts 52 of the relay C1U cause leads corresponding to the accumulator "0" positions ("16" in the illustrative case) to be energized. Thus the width entry of "16" to the accumulator is the same as in step (3) of the "tab left" operation, but is divided between the two registers which each receives the value "8" because the relays TH and TS are energized.

As noted above, the lead 2 may be energized in this position of the operation. If this occurs, a relay 2S is energized through the lead 108, and this relay holds through break contacts of a relay 2SA. Contacts 110 of the relay 2S close. When the key Tab is released, contacts 111 of the relay C1U close to complete a circuit whereby the next impulse on the contacts 74 passes to a connection 112. This sends a "2" to the auxiliary register 19. The same impulse sustains the holding circuit of the relay 2S through a rectifier 114 and energizes the relay 2SA through a rectifier 116. When the impulse disappears the relays 2S and 2SA will become deenergized and the impulse circuit to the connection 112 is opened.

This same impulse is connected through the connection 78 to the lead 128. Because of the operation of the relays TH and TS, this impulse and any such impulse following it is entered as a "64" in each of the registers. In the present example, two pulses of value "64" reach each register. Entries of "128" are made to the accumulator until the relay TB is deenergized by a voltage on the lead 28 as previously described. This also opens the holding circuit through the break contacts *tb* for the relays THA, TSA and TH and results in deenergizing the relay TS. Thus the register and accumulator entries for column 1 are completed. It will be noted that the width in the accumulator equals the assigned total length of the column, that the sum of the widths stored in the two registers is also equal to the column length, and that the widths stored in the latter during the tabulation calculation are either equal or differ by no more than two space units. During transcription of the line, the reading of the "SAF" code in the register before the text will cause the width stored in the auxiliary register 19 to be sent to the character spacing unit. The text will then be read, after which the space stored in the remaining positions of the register will be sent to the spacing unit.

The steps for each succeeding "tab center" column are repetitions of those described above.

*Tab leaders*

In this form of tabulation, the text of each column is divided with one portion flush with the left margin of the column and the other portion flush with the right margin. Between these two portions there may be leader characters such as dots, for example, or merely a blank space. The keyboard sequence is as follows: (1) preset the accumulator, (2) type the portion of the text of column 1 to be flush with the left margin of the column, (3) depress the key Tab Leaders alone if a blank space is desired, or alternatively, if leader characters are desired, depress a key TLC and then depress the key Tab Leaders, (4) type the portion of the text of column 2 to be flush with the right margin of the column, (5) depress the key Tab, (6) repeat above steps starting with step (2) for column 2, etc. The resulting operations affect the accumulator and register entries as follows.

Step (1) is identical with step (1) in each of the above-described operations.

In step (2) the register and accumulator entries are normal and occur as described in said application Serial No. 531,023. This step is identical with step (2) in the "tab left" sequence described above.

In step (3) depression of the key Tab Leaders causes energization of relays ROA and TSA through contacts 118 and 120, respectively. These relays lock on the lead 83 through the break contacts *ts*. Through contacts 122 the terminal 86 is energized to send the code "SAF" to the unit REC through the cable AC. If leader characters are desired, the closure of the key TLC adds the code "E" to cause the register position to read "SAEF." It will be understood that the key TLC is a switch which remains in the closed position until opened. Through the lead 88 an "X"-punch is also sent to the tape register and it then advances one step.

In step (4) the register and accumulator entries are normal as in step (2).

In step (5), depression of the key Tab causes the circuit to function exactly as in step (4) of the operation "tab right" described above. The space necessary to fill out the column is computed and sent to the auxiliary register 19. In the given example this consists of three rows of punches representing the widths "16," "128" and "128," consecutively. During the transcription process, the space necessary to fill out the column will be inserted at the point where the code "SAF" or "SAEF" appears in the register, and characters will be inserted in response to the latter code.

*Alternative manual operations*

The operations described above, except for the "tab left" sequence, are accomplished by the use of two registers. In such cases, an auxiliary register 19 contains space information which is sent to the character spacing apparatus when the code "SAF" or "SAEF" is found in the principal register associated with the unit REC. These operations may be performed by the use of only the principal register by means of manual keys HCM, COM and ROM, as follows:

In the "tab right" operation, the keyboard sequence is as follows: (1) preset the accumulator, (2) close the key ROM, (3) type the text of column 1, (4) open the key ROM, (5) depress the key Tab, (6) close the key COM, (7) repeat step (3), (8) open the key COM, (9) repeat the foregoing steps for column 2 starting with step (2), etc. Step (1) is identical to the first step in the previously described sequences. In steps (2) to (4) the accumulator adds the width of the text and the register receives no entry. In step (5) the space necessary to fill out the line is computed and entered in the unit REC and the accumulator. In steps (6) to (8) the text is entered in the register but its width is not entered in the accumulator. Thus the total selected column width has been entered in the accumulator, and the space necessary to fill out the column appears in one or more positions before the text in the register.

In the "tab leaders" operation, the keyboard sequence is, (1) preset the accumulator, (2) close the key ROM, (3) type the portion of column 1 text to be flush with the right margin of the column, (4) open the key ROM, (5) type the portion of column 1 text to be flush with the left margin of the column, (6) depress the key Tab, (7) close the key COM, (8) repeat step (3), (9) open the key COM, (10) repeat the foregoing steps for column 2 starting with step (2), etc. Step (1) is identical to the first step in the previously described sequences. In steps (2) to (4) the accumulator adds the width of the right-hand portion of text. In step (5) the left-hand portion of text is entered in the accumulator and register. In step (6) the space necessary to fill out the column is computed and entered in the accumulator and register. In steps (7) to (9) the right-hand portion of text is entered in the register.

If leader characters are desired, after step (5) a combination of seven manual keys MLC is depressed, whereby a code corresponding to the desired character is entered in the register in each position which receives a code "128" during the tabulation calculation of step (6).

For the "tab center" operation, an additional plug 34 is inserted within the width of each column. If the column width is an even multiple of 128 units, the additional plug is inserted in the jack corresponding to half the column width; and if the column width is an odd multiple of 128 units the additional plug is inserted in the jack corresponding to half the next higher multiple of 128 units. Thus, in column 1 of the assumed case, a plug is inserted in a jack 124 as well as in the jack 38. The keyboard sequence is, (1) preset the accumulator, (2) close the keys ROM and HCM (3) type the text of column 1, (4) enter the width "128" by means of the fixed space unit 24 if the column width is an odd multiple of 128 units, (5) open the keys ROM and HCM, (6) depress the key Tab, (7) close the key HCM, (8) repeat step (3), (9) open the key HCM, (10) repeat step (6), (11) repeat the foregoing steps for column 2 starting with step (2), etc. Step (1) is identical to the first step in the previously described sequences. In steps (2) to (4) one-half the width of the text is added in the accumulator by the transfer of connections through the contacts of the relay HC, and if the column width is an odd multiple of 128 units, an additional count of 64 units is added. In steps (5) and (6) one-half the space necessary to fill out the column is computed and entered in the accumulator and register. In steps (7) to (9) one-half the width of the text is added in the accumulator and the text is entered in the register. In step (10) the remaining space necessary to fill out the column is computed and entered in the accumulator and register.

It will be understood that the above described manual operations are carried out in several consecutive steps. If desired, these steps may be made semi-automatic by means of a program stepping switch in accordance with well-known electrical control techniques.

The foregoing description is based on the provision of column widths equal to multiples of 128 space units. It will be apparent, however, that the method of computation and the apparatus may be readily adapted in accordance with the invention to provide columns equal to multiples of any other power of "2."

From the foregoing description, it will be seen that the justification setting for normal text placed before or after the tabulated material is not changed during the composition of the latter. It is only necessary to plug the appropriate column jacks 44 and to operate the keys according to the appropriate sequence described above. If the auxiliary register 19 is used, it is not necessary to repeat the typing of any portion of the text, whereas repeat typing of the text is used where a portion of text occurs to the right of a space which has a length dependent on the length of text. The described operations occur in rapid succession and the speed and ease of tabulation composition are greatly increased.

If desired, a single register, which may take the form of a perforated tape recorder like that described herein, may be used to store all of the information including that sent to the main and auxiliary registers. In that case the tape will be a composite one. Such a composite tape may be obtained by sending the spacing impulses which go to the variable escapement during transcription to this register as well.

It will be further understood that, while the invention has been described with reference to a preferred embodiment thereof, various modifications, adaptations and changes may be effected therein in accordance with means known to those skilled in this art without departing from the spirit or scope of the invention.

Having thus described the invention, we claim:

1. In type composing apparatus, tabulation means including the combination of a counter, means to enter successive values in the counter corresponding to the widths of characters in a column, a stepping switch, means to step the switch once each time the counter reaches a multiple of a given space, and means to advance the counter after the character widths of a column are entered to cause said switch to reach a predetermined position corresponding to a column width.

2. In type composing apparatus, the combination of a register, means to enter in the register information corresponding to the characters and interword spaces in a column of type including the widths of said characters and spaces, a counter, means to enter said widths in the counter, a stepping switch, means to step the switch once each time the counter reaches a multiple of a given space, and means to enter space in the counter and register after the characters are entered to cause said switch to reach a predetermined position corresponding to a column width.

3. In a type composing apparatus, the combination of a main register, means to enter in said register information corresponding to the characters and interword spaces in a column of type including the widths of said characters and spaces, a counter, means to enter said widths in the counter, a stepping switch, means to step the switch once each time the counter reaches a multiple of a given space, an auxiliary register, and means to enter space in the counter and auxiliary register after the characters are entered in the main register to cause said switch to reach a predetermined position corresponding to a column width.

4. In type composing apparatus, the combination of a main register, means to enter in said register information corresponding to the characters and interword spaces in a column of type including the widths of said characters and spaces, means to enter in said register a tabulation code at a selected position in said column, a counter, means to enter said widths in the counter, a stepping switch, means to step the switch once each time the counter reaches a multiple of a given space, an auxiliary register and means to enter space in the counter and auxiliary register after the characters are entered in the main register to cause said switch to reach a predetermined position corresponding to a column width.

5. In type composing apparatus, the combination of a main register, an auxiliary register, a counter, a circuit of binary code leads connected to the counter, a relay having contacts connected to said circuit and connections to said registers, said relay being adapted to transfer the code lead of each order in said circuit to the next lower order position of said registers, means to energize said circuit to enter in the main register information corresponding to the characters and interword spaces in a column of type including the widths of said characters and spaces, said circuit entering said widths in the counter, a stepping switch, means to step the switch once each time the counter reaches a multiple of a given space, and means to enter space in the counter after the characters are entered to cause said switch to reach a predetermined position corresponding to a column width, said relay being caused to enter substantially half said space in each of said registers.

6. In type composing apparatus, the combination of a main register, an auxiliary register, a counter, a circuit of binary code leads connected to the counter, a relay having contacts connected to said circuit and connections to said registers, said relay being adapted to transfer the code lead of each order in said circuit to the next lower order position of said registers, means to energize said circuit to enter in the main register information corresponding to the characters and interword spaces in a column of type including the widths of said characters and spaces, said circuit entering said widths in the counter, means to enter a tabulation code in the main register before and after said characters, a stepping switch, means to step the switch once each time the counter reaches a multiple of a given space, and means to enter space in the counter after the characters are entered to cause said switch to reach a predetermined position corresponding to a column width, said relay being caused to enter substantially half said space in each of said registers.

7. In type composing apparatus, the combination of a binary counter, means to enter successive values in the counter corresponding to the widths of characters in a column, a stepping switch, means to step the switch once each time the counter reaches a multiple of a given space, a circuit associated with the counter to enter therein a value to advance it after the character widths of a column are entered to the next higher multiple of said given space, means to advance the counter thereafter in steps equal to said given space to cause said switch to reach a predetermined position corresponding to a column width, and means to record the space values entered in the counter after the characters are entered therein.

8. In type composing apparatus, the combination of a register, means to enter in the register information corresponding to the characters and interword spaces in a column of type including the widths of said characters and spaces, means to enter a tabulation code at a selected position in said column, a circuit for selection of a leader character, a counter, means to enter said widths in the counter, a stepping switch, means to step the switch once each time the counter reaches a multiple of a given space, and means to enter said given space in the counter and register repeatedly after the characters are entered to cause said switch to reach a predetermined position corresponding to a column width, said last-mentioned means being adapted to enter the code for the selected leader character in the register once for each entry of said given space.

9. In type composing apparatus, tabulation means including the combination of a counter, a main register, means to enter successive values in the counter and main register corresponding to the widths of characters in a column, a stepping switch, means to step the switch once each time the counter reaches a multiple of a given space, an auxiliary register, and means to enter a width value in the auxiliary register corresponding to the number of steps of the switch remaining to reach a predetermined value after the character widths are entered in the main register.

References Cited in the file of this patent

UNITED STATES PATENTS

| | | |
|---|---|---|
| 2,379,862 | Bush | July 10, 1945 |
| 2,797,787 | Higonnet et al. | July 2, 1957 |